United States Patent
Tomita et al.

(10) Patent No.: US 6,295,175 B1
(45) Date of Patent: Sep. 25, 2001

(54) APPARATUS FOR RECOGNIZING SPIN VALVE HEAD FAILURE DUE TO PIN LAYER MAGNETIC FIELD OFFSET

(75) Inventors: Isamu Tomita; Takao Koshikawa; Toshinori Hoshino; Tadashi Nakamura; Hitoshi Kanai; Hiroaki Ueno, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/218,494

(22) Filed: Dec. 22, 1998

(30) Foreign Application Priority Data

Feb. 13, 1998 (JP) .................................................. 10-030775

(51) Int. Cl.⁷ .............................. G11B 27/36; G11B 5/09; G11B 5/03; G11B 5/596; G11B 5/127
(52) U.S. Cl. .................................. 360/31; 360/53; 360/66; 360/77.08; 360/313; 360/324.1
(58) Field of Search ................................ 360/66, 75, 313, 360/324.1, 324.11, 324.12, 327.23, 31, 53, 77.08; 324/252

(56) References Cited

U.S. PATENT DOCUMENTS

| | | | |
|---|---|---|---|
| 5,650,887 | 7/1997 | Dovek et al. | 360/75 |
| 5,748,399 | * 5/1998 | Gill | 360/66 |
| 5,969,523 | * 10/1999 | Chung et al. | 360/66 |

* cited by examiner

Primary Examiner—Regina Y. Neal
(74) Attorney, Agent, or Firm—Greer, Burns & Crain, Ltd.

(57) ABSTRACT

When a pin layer magnetic field offset judgment unit judges that a magnetic field in a pin layer of a spin valve head through which a sense current flows in the interference direction has been deviated from a normal direction, a recovery processing unit allows a recovery from the abnormality arising from the magnetic field offset. For example, the direction of the sense current is switched from the interference direction to the assist direction, and the sense current larger than that upon the ordinary reading action is allowed to flow so that the temperature of an antiferromagnetic layer exceeds the blocking temperature, whereby the direction of the magnetic field in the pin layer is modified to the normal direction by the action of a magnetic field generated from the sense current. After the modification, the sense current is returned to have its ordinary value in the interference direction.

17 Claims, 14 Drawing Sheets

F I G. 7
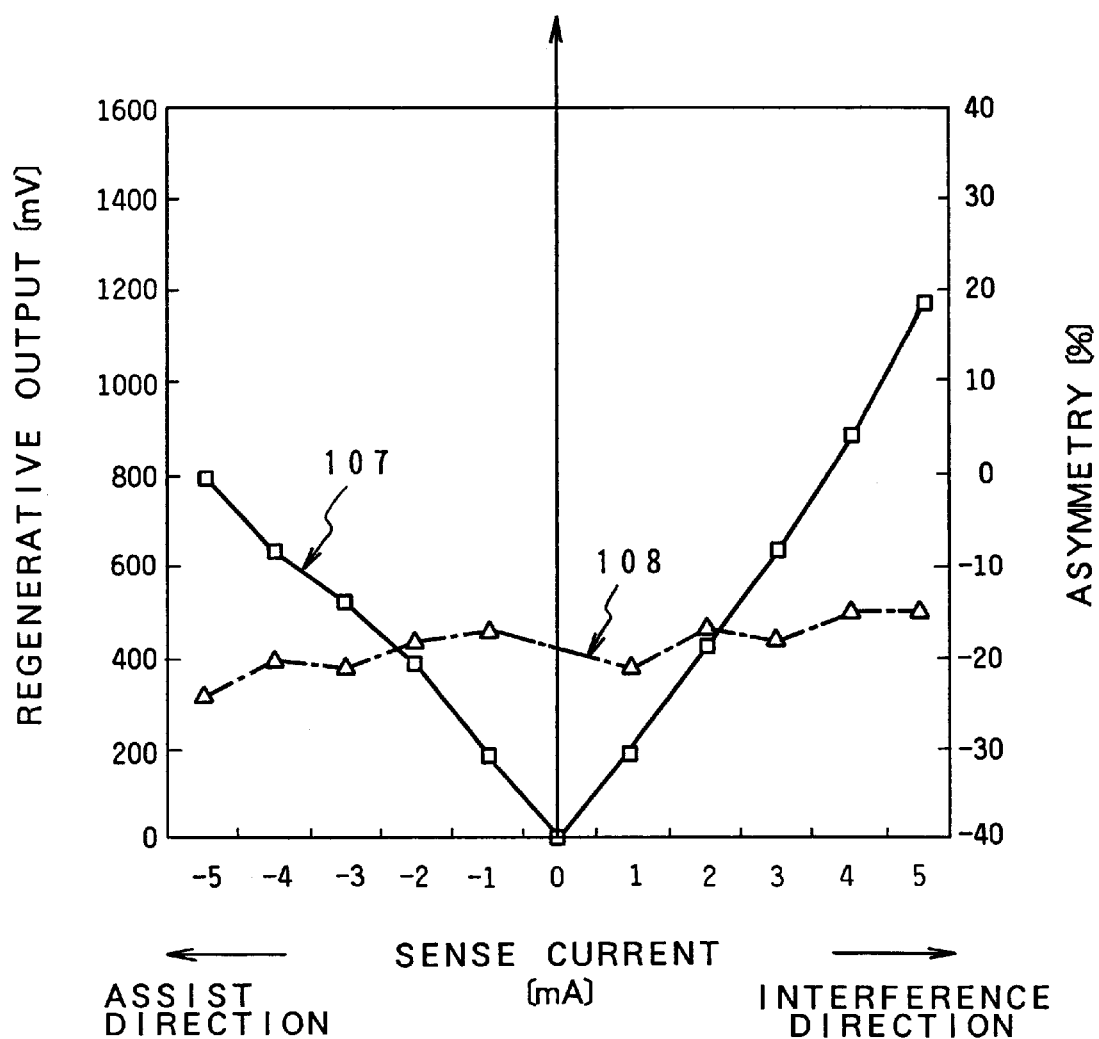

| HEAD No. | SENSE CURRENT DIRECTION |
|---|---|
| 01 | INTERFERENCE DIRECTION |
| 02 | INTERFERENCE DIRECTION |
| 03 | INTERFERENCE DIRECTION |
| 04 | INTERFERENCE DIRECTION |
| 05 | ASSIST DIRECTION |
| 06 | INTERFERENCE DIRECTION |
| 07 | INTERFERENCE DIRECTION |
| 08 | INTERFERENCE DIRECTION |

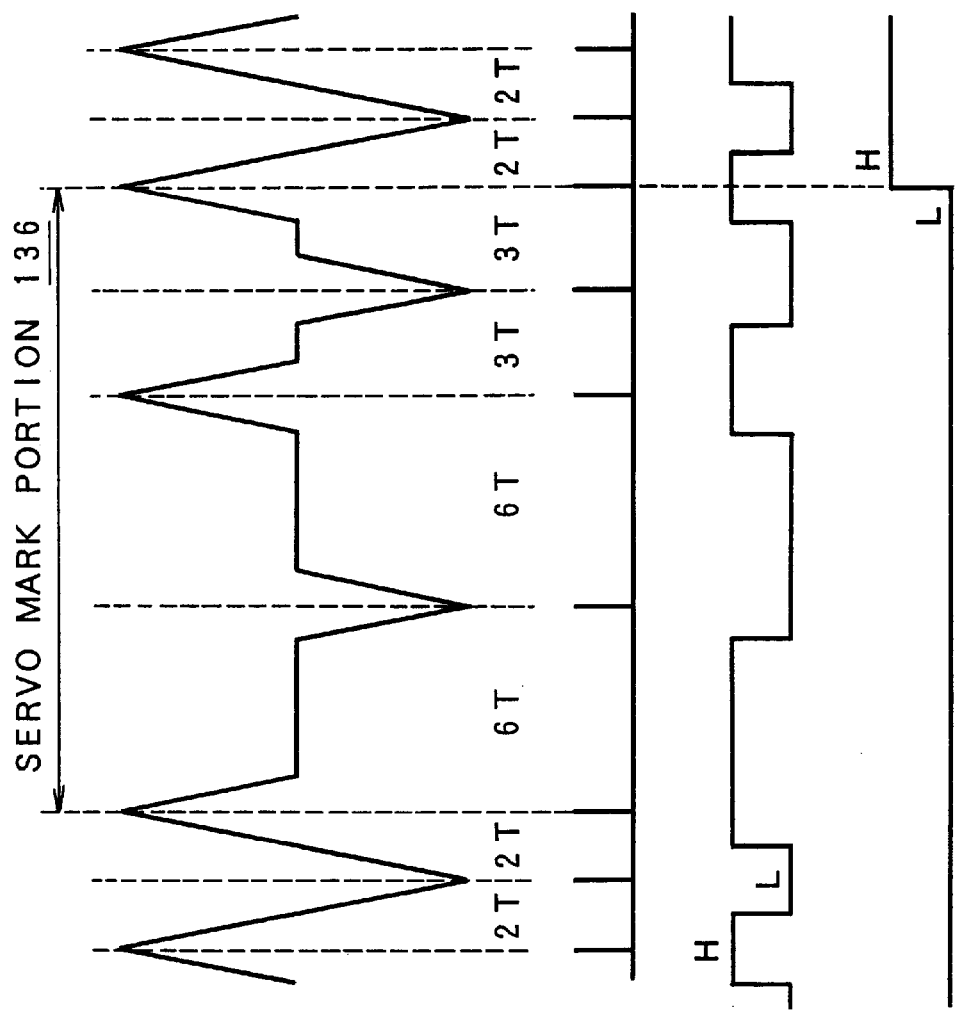

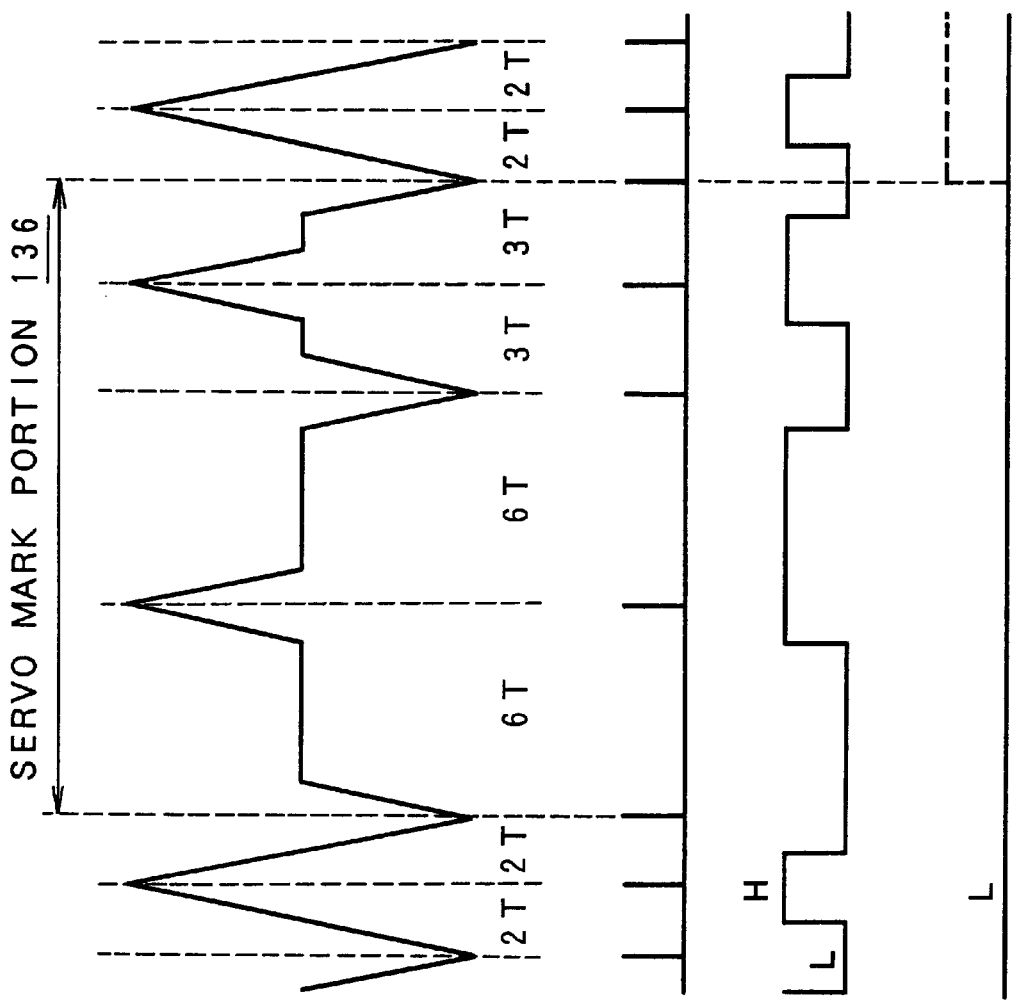

APPARATUS FOR RECOGNIZING SPIN VALVE HEAD FAILURE DUE TO PIN LAYER MAGNETIC FIELD OFFSET

BACKGROUND OF THE INVENTION

1. Field of the Invention

The present invention relates generally to a storage apparatus such as a magnetic disk apparatus using a spin valve head as a read head integrated with a write head, and more particularly to a storage apparatus using a spin valve head through which a sense current flows in the interference direction generating a magnetic field opposite in direction to a magnetic field in a pin layer.

2. Description of the Related Arts

With the increased capacitance of the magnetic disk apparatus, the recording density on a magnetic disk medium has become further improved. Such a high recording density that exceeds 3 Gbit/inch$^2$ is making it difficult to use as an apparatus due to the lowering in the regenerative signal level and the degradation in the SN ratio. Thus, in order to achieve such a high recording density that exceeds 3 Gbit/inch$^2$, the spin valve head has been put to practical use. The spin valve head basically has a four-layered structure consisting of an antiferromagnetic layer, a pin layer, a nonmagnetic layer and a free layer. This structure allows the direction of magnetization in the pin layer in contact with the antiferromagnetic layer to be fixed and prevents the free layer separated by the nonmagnetic layer from having a fixed direction of magnetization. When an external magnetic field is applied thereto in the form of a record magnetic field of the medium, the direction of the magnetic field of the free layer is determined by the external magnetic field, and a resistance value varies depending on the difference relative to the direction of the magnetic field of the pin layer. This resistance value is maximized when the directions of the magnetic field in the free layer and the pin layer are opposite 180 degrees to each other, and is minimized when they are identical. Furthermore, the spin valve head allows a sense current to flow therethrough in order to cancel an unnecessary vertical bias magnetic field which may be applied to the free layer as a result of a magnetic coupling of the pin layer which could be called a permanent magnet from its effective aspect. The direction in which the sense current flows includes two directions, that is, an assist direction generating a magnetic field in the same direction as the pin layer, and an interference direction generating a magnetic field opposite to the pin layer. Typically, the interference direction results in a larger output and smaller vertical asymmetry.

In the case of the spin valve head through which the sense current flows in the interference direction, however, a magnetic field by the sense current is generated in the opposite direction to the magnetic field in the layer, so that there arises a problem that the direction of the magnetic field in the pin layer may be offset if the temperature of the antiferromagnetic layer exceeds the blocking temperature due to the external temperature, heating of the element, static electricity, etc. In case the antiferromagnetic layer is made of FeMn in particular, the blocking temperature is as low as 150° C., which may cause a serious problem. In the assist direction, on the other hand, the direction of the magnetic field in the pin layer is the same as the direction of the magnetic field generated by the sense current, so that any offset of the magnetic field in the pin layer is hard to occur.

SUMMARY OF THE INVENTION

It is therefore the object of the present invention to provide a storage apparatus ensuring a normal action even though an offset of the direction of the magnetic field has occurred in a pin layer of a spin valve head through which a sense current flows in the interference direction.

The present invention is directed to a storage apparatus provided with a plurality of heads each having a read head and a write head which have been integrated thereinto, the read head comprising a spin valve head having a multilayered structure including an antiferromagnetic layer, a pin layer, a nonmagnetic layer and a free layer, the spin valve head electrically reading record information from a variation in the magnetic reluctance in response to a record magnetic field of a medium applied in the form of an external magnetic field with a sense current being allowed to flow therethrough in the interference direction causing a magnetic field opposite to the magnetic field in the pin layer. Such a storage apparatus using as the read head the spin valve head through which a sense current flows in the interference direction is characterized in that in the present invention it comprises a pin layer magnetic field offset judgment unit which, when there is judged a predetermined abnormality attributable to a magnetic field offset in the pin layer of the spin valve head, inverts the direction of the sense current and consequently if the predetermined abnormality is eliminated, judges that an offset of the magnetic field has occurred in the pin layer; and a recovery processing unit which, when the pin layer magnetic field offset judgment unit has judged that an offset of the magnetic field in the pin layer has occurred, allows a recovery from the abnormality arising from the offset in the magnetic field. That is, the present invention gives attention to the fact that when a sense current in the interference direction flows through the spin valve head, any possible offset of the direction of the magnetic field in the pin layer may cause an inversion of the polarity of the head read signal, a decrease of the amplitude of the head output as well as an enlarged vertical asymmetry, to thereby judge whether the direction of the magnetic field in the pin layer is normal or not. If an abnormality has been judged, the sense current is inverted, and consequently if the abnormality has been eliminated, a magnetic field offset in the pin layer is judged to perform recovery processing for modifying the direction of the magnetic field in the pin layer. By having a function for detecting an offset of the magnetic field in the pin layer which may be caused by some reason and modifying the direction of the magnetic field in the pin layer in this manner, a stable action is assured with the sense current in the interference direction flowing through the spin valve head, to contribute to an improvement in the reliability of the apparatus.

For example the pin layer magnetic field offset judgment unit, when servo marks recorded on said record medium can be detected no longer, may judge that there has occurred an abnormality attributable to a magnetic field offset in the pin layer, and may invert the direction of the sense current and consequently if it has become possible to detect the servo marks, judge that an offset of the magnetic field has occurred in the pin layer. The recovery processing unit when it has become possible to detect the servo marks as a result of switching of the direction of the sense current from the interference direction to the assist direction, allows the sense current to flow through the spin valve head in the assist direction upon the reading action. To this end, the recovery processing unit when the direction of the sense current has been switched to the assist direction as a result of occurrence of an offset of the magnetic field in the pin layer, stores into a nonvolatile memory that the direction of the sense current is the assist direction in a manner corresponding to head numbers, the recovery processing unit determining the direction of the sense current upon the reading action on the basis of the content of record of the nonvolatile memory. The recovery processing unit when the direction of the sense current has been switched to the assist direction, allows upon the reading action the sense current to flow with a larger current value than the current value in the interference direction before switching. This is due to the necessity to compensate for the read signal level in the assist direction lower at the same current value than that in the interference direction. The pin layer magnetic field offset judgment unit may compare an output level of the spin valve head with its initial value and, if the difference lies within a predetermined range, may judge that an abnormality attributable to an offset of the magnetic field has occurred in the pin layer. The pin layer magnetic field offset judgment unit may measure vertical asymmetry of a read signal of the spin valve head and, if a difference between the vertical asymmetry and its initial value has exceeded a certain range, may judge that an abnormality attributable to an offset of the magnetic field has occurred in the pin layer. Furthermore, the pin layer magnetic field offset judgment unit when an error rate of read data demodulated from a read signal of the spin valve head has exceeded a predetermined slice value, may judge that an offset of the magnetic field has occurred in the pin layer. The timing of the judgment by the pin layer magnetic field offset judgment unit is for example when a first on-track has been made after the supply of the power or when the timer calibration has been made. At these timings, the pin layer magnetic field offset judgment unit judges for all of the plurality of spin valve heads whether an offset of the magnetic field has occurred in the pin layer.

The recovery processing unit when it is judged that an offset of the magnetic field has occurred in the pin layer, moves the spin valve head to an area in which no medium data have been stored, to switch the direction of the sense current from the interference direction to the assist direction, the recovery processing unit simultaneously allowing a larger sense current than that at the ordinary reading to flow therethrough so that the temperature of the antiferromagnetic layer exceeds the blocking temperature, so as to modify the magnetic field in the pin layer to the normal direction by the action of a magnetic field generated by the sense current. The recovery processing unit after the modification allows a return of the value of the sense current to its ordinary value in the interference direction. The recovery processing unit when interrupting the sense current switched to the assist direction to modify the magnetic field in the pin layer, gradually diminishes the value of the sense current so as to ensure that the magnetic field continues to be applied in the correct direction even when the temperature has fallen to below the blocking temperature of the antiferromagnetic layer. The recovery processing unit moves the spin valve head to a contact start stop area at the innermost of the medium to return the direction of the magnetic field in the pin layer to the normal direction. Alternatively, the spin valve head may be moved to the ramped loading mechanism to return the direction of the magnetic field in the pin layer to the normal direction.

Furthermore, the recovery processing unit is provided with a magnet located at a position to which the head is movable other than positions on the medium, the magnet generating a magnetic field in the normal magnetic field direction in the pin layer, and the recovery processing unit when it is judged that an offset of the magnetic field has occurred in the pin layer, may move the spin valve head to the position of the magnet and allow a current to flow through the spin valve to raise the temperature of the antiferromagnetic layer to modify the direction of the magnetic field in the pin layer to the ordinary direction. The recovery processing unit after the modification allows a return of the value of the sense current to its ordinary value in the interference direction.

The pin layer magnetic field offset judgment unit when it is judged that an offset of the magnetic field has occurred in the pin layer of a spin head valve, provides an error response to a write command specifying a write head integrated with the spin valve, to prohibit the writing action. This is due to the fact that the offset of the direction of the magnetic field in the pin layer results in a variation in the sensitivity of the spin valve head, which in turn causes a variation in the servo information read from the medium, leading to an enhanced possibility to cause an offset of the track center position. If the writing action is executed with the track center position offset, the writing is performed with significant off-track relative to the target track, which may possibly erase the information at the adjacent track. Thus, when it is judged that an offset of the magnetic field has occurred in the pin layer, the writing action is prohibited. The pin layer magnetic field offset judgment unit after the recovery from abnormality arising from an offset of the magnetic field in the pin layer by the pin layer magnetic field offset judgment unit, reads a data pattern for read margin measurement recorded on a system space of the medium and, if at least offset margin on the outer side is substantially equal to that on the inner side and if a read margin such as a Viterbi slice margin and the offset margin satisfies a prescribed value, releases the write prohibition.

According to another aspect of the present invention, there is provided a storage apparatus provided with a plurality of heads each having a read head and a write head which have been integrated thereinto, the read head comprising a spin valve head having a multilayered structure including an antiferromagnetic layer, a pin layer, a nonmagnetic layer and a free layer, the spin valve head electrically reading record information from a variation in the magnetic reluctance in response to a record magnetic field of a medium applied in the form of an external magnetic field with a sense current being allowed to flow therethrough in the interference direction causing a magnetic field opposite to a fixed magnetic field in the pin layer, the storage apparatus comprising a retry processing unit for executing retry processing in response to a read error of a specified head; and a recovery processing unit which when it is impossible for the retry processing unit to allow a recovery from the error, performs recovery processing for returning the direction of the magnetic layer in the pin layer to its normal direction. In this case, the recovery processing unit moves the spin valve head to an area in which no medium data have been stored, to switch the direction of the sense current to the assist direction, the recovery processing unit simultaneously allowing a larger sense current than that at the ordinary reading to flow therethrough so that the temperature of the antiferromagnetic layer exceeds the blocking temperature, so as to modify the magnetic field in the pin layer to the normal direction by the action of a magnetic field generated by the sense current. The recovery processing unit after the modification allows a return of the value of the sense current to its ordinary value in the interference direction. In such another aspect of the present invention, the judgment of the occurrence of the offset of the direction of the magnetic field in the pin layer is not carried out, but the recovery processing is carried out for returning the direction of the magnetic field in the pin layer to the normal direction as a part of the error recovery upon the occurrence of the read error, to thereby improve the reliability in the case of using the spin valve head through which the sense current flows in the interference direction.

The above and other objects, aspects, features and advantages of the present invention will become more apparent from the following detailed description with reference to the accompanying drawings.

BRIEF DESCRIPTION OF THE DRAWINGS

FIG. 7 is a characteristic diagram of a regenerative output and asymmetry of the spin valve head with respect to the direction of a sense current;

FIG. 10 is an explanatory diagram of a sense current direction register table of FIG. 9;

FIGS. 11A to 11D are timing charts of detection of a servo mark when the pin layer magnetic field direction is normal;

FIGS. 12A to 12D are timing charts of detection of a servo mark when the polarity of the regenerative output has been inverted due to the offset of the magnetic field direction in the pin layer;

DETAILED DESCRIPTION OF THE PREFERRED EMBODIMENTS

Figure 1:
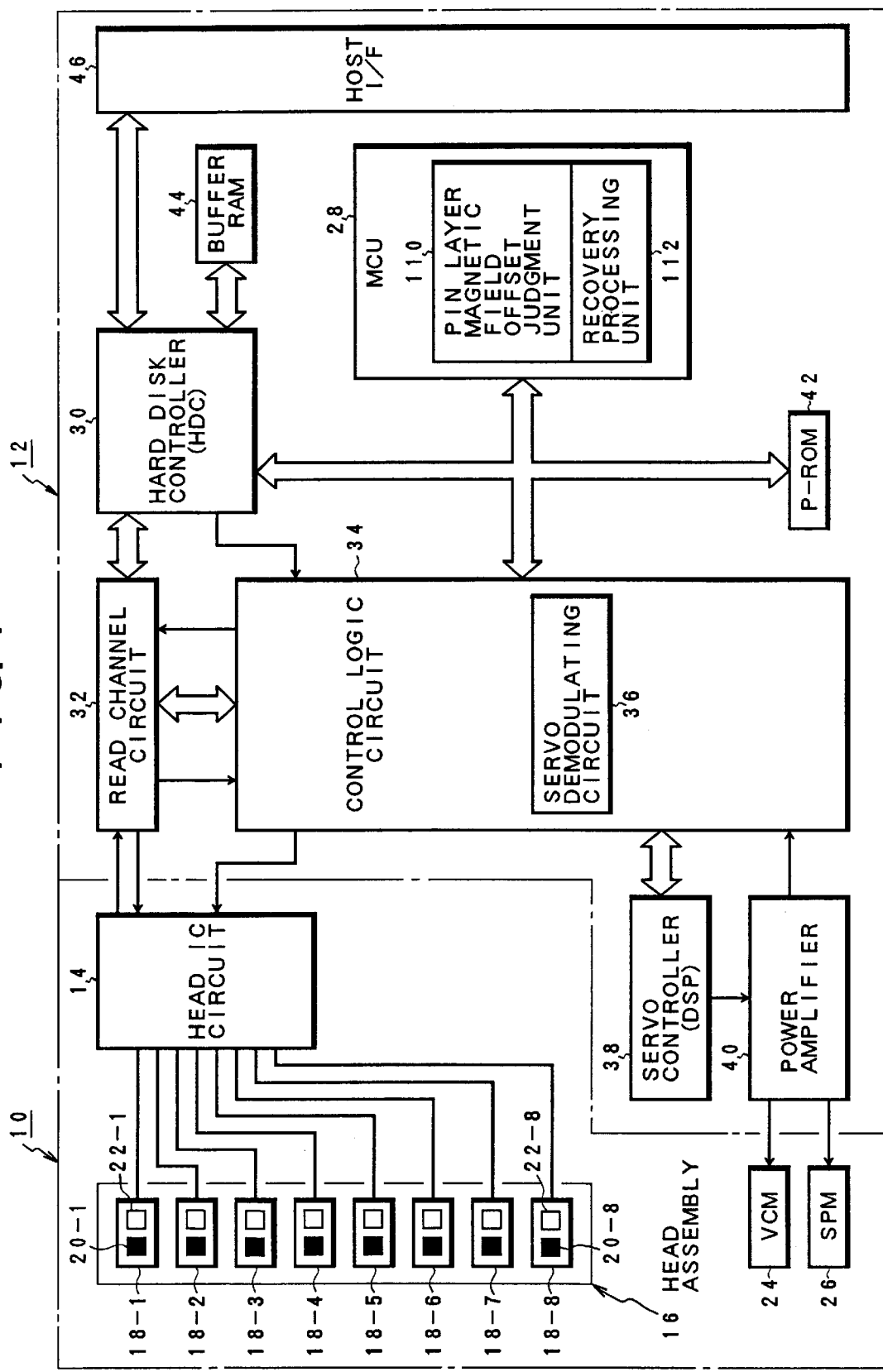
FIG. 1 is a block diagram of a hard disk drive to which the present invention is applied.

FIG. 1 is a block diagram of a magnetic disk apparatus to which the present invention is applied. The magnetic disk apparatus known as a hard disk drive (HDD) is constituted by a disk enclosure 10 and a control board 12. The disk enclosure 10 comprises a head IC circuit 14, a head assembly 16 supported by a head actuator at its tip and positioned in the direction across a track on a magnetic disk medium, a voice coil motor (hereinafter, referred to as VCM) 24 for driving the head actuator, and a spindle motor 26 for revolving the magnetic disk medium. The head assembly 16 includes eight composite heads 18-1 to 18-8 in this embodiment. The composite heads 18-1 to 18-8 are provided respectively with spin valve heads 20-1 to 20-8 acting as read heads and with write heads 22-1 to 22-8 using inductive heads. The control board 12 comprises an MCU 28 for providing an entire control of the hard disk drive, a hard disk controller (HDC) 30, a read channel circuit 32, a control logic circuit 34 equipped with a servo demodulation circuit 36, a servo controller 38 using a DSP for driving the VCM 24 and the spindle motor 26 by means of a power amplifier 40, a flash P-ROM 42 serving as a nonvolatile memory, a buffer RAM 44 using a DRAM, and a host interface 46 for allowing an interchange of data and signals with a host serving as an upper apparatus. The MCU 28 of the control board 12 is provided with a pin layer magnetic field offset judgment unit 110 for judging on the basis of a program control thereof that the pin layer magnetic field in the spin valve head of the present invention has offset from the ordinary direction, and a recovery processing unit 112 for achieving a recovery from abnormality attributable to a magnetic field offset through modification of the magnetic field offset upon the judgment of the pin layer magnetic field offset by the pin layer magnetic field offset judgment unit 110. The details of the pin layer magnetic field offset judgment unit 110 and the recovery processing unit 112 will become apparent from the description which will be made later. The read channel circuit 32 includes a circuit permitting a write access or a read access to one of the composite heads 18-1 to 18-8 which has been selected by the head IC circuit 14. That is, upon the write action when a read gate signal to the read channel circuit 32 is turned on by the hard disk controller 30, a write demodulation system becomes effective. That is, an 8/9 encoder for example encodes NRZ write data which have been formatted and ECC encoded by the hard disk controller 30, after which a precoder performs a 1/(1+D) precode for a maximum likelihood detection of a partial response class 4, after which a write compensation is carried out to provide an output to the head IC circuit 14. Finally, a write FF performs a conversion to a write signal and a write amplifier performs a record onto the magnetic disk medium by use of the write head of the composite head being selected at that time. Upon the read action when a read gate signal from the hard disk controller 30 is turned on, the head IC circuit 14 amplifies a read signal from the spin valve head serving as the read head being selected at that time to provide it as an input to a read demodulation system of the read channel circuit 32. The resultant signal is amplified by an AGC amplifier and then passed through a lowpass filter. Then, an automatic equalizer performs a waveform equalization of the partial response class 4 for example, and a Viterbi detector restores the read data on the basis of the maximum likelihood. Then after the execution of (1−D) decoding corresponding to the preceding, the 8/9 decoder demodulates the NRZ read data and provides it as its output to the hard disk controller 30. The hard disk controller 30 performs the ECC decodig processing and, if correctable errors exist, performs error correction, after which the read data are transferred via the buffer RAM 44 to the host by the host interface 46. The servo controller 38 receives head position information based on a servo signal which has been demodulated by the servo demodulation circuit 36 provided in the control logic circuit 34 and provides through the drive of the VCM 24 a seek control for moving the head to a target track and an on-track control after the completion of the seek. It also provides an activation control of the spindle motor 26 upon the activation by supply of power to the hard disk drive, as well as a constant speed control for keeping at a predetermined certain revolving speed after the completion of the activation. The control logic circuit 34 is further provided with a power saving function for switching to a power down mode in the state waiting for the access from the host for example, but releasing the power down mode when accessed to return to an ordinary mode, thereby achieving a reduction of the power consumption. The control logic circuit 34 is further provided with a timer function for executing by the servo controller 38 a variety of calibrations including the judgment of the offset in the direction of the magnetic field of the pin layer in the spin valve head of the present invention in accordance with the time schedule starting from the supply of the power.

Figure 2:
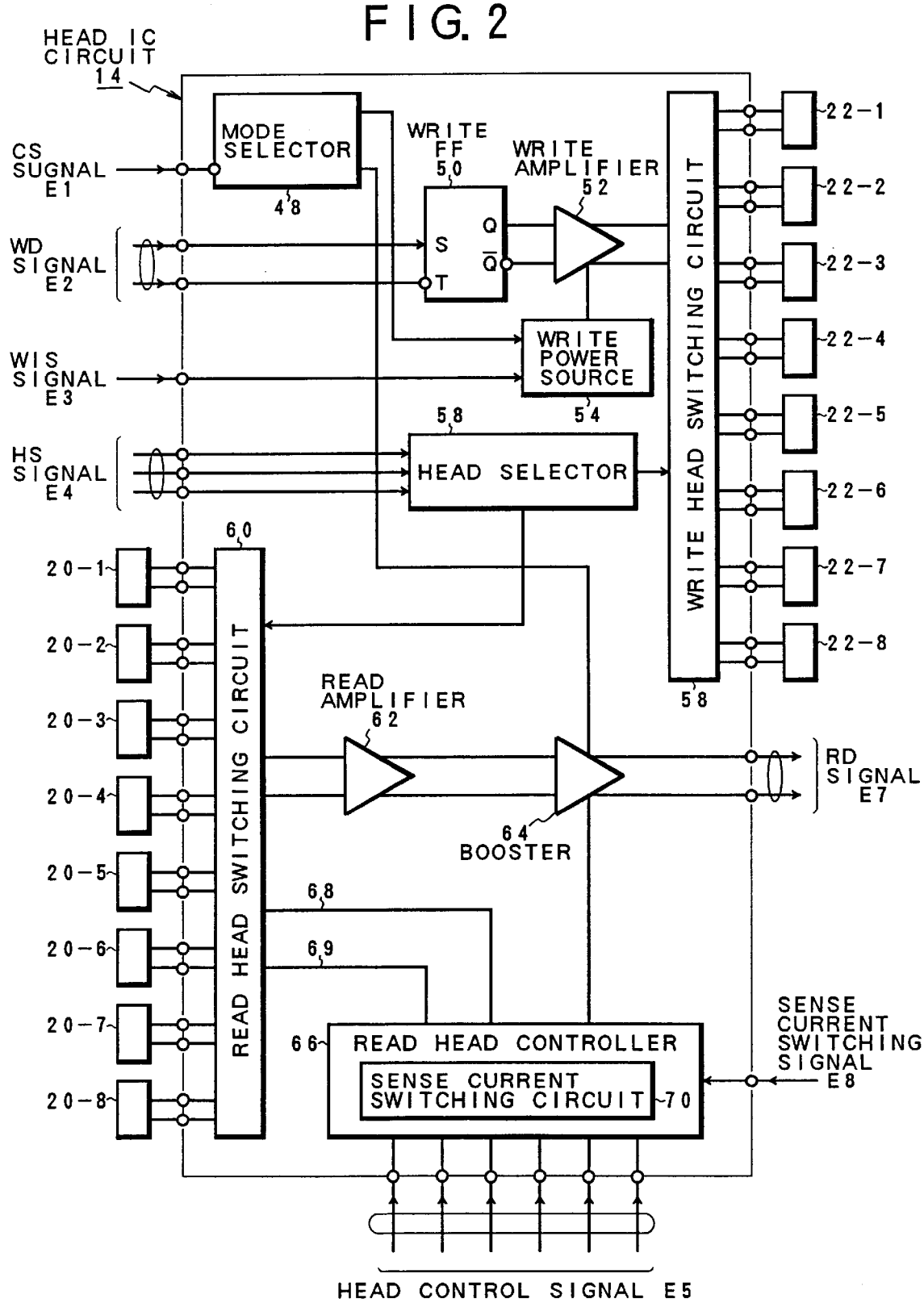
FIG. 2 is a block diagram of a head IC circuit of FIG. 1.

FIG. 2 is a block diagram of the head IC circuit 14 provided in the disk enclosure of FIG. 1. The head IC circuit 14 includes a mode selector 48 so as to select a write action or a read action on the basis of a chip select signal (CS signal) E1 from the dedicated logic circuit 34. Upon the selection of the read action, a write power source 54 is made effective, allowing a write current to be determined by a write current setting signal (WIS signal) E3 being supplied at that time. Upon the selection of the write action, a write data signal (WD signal) E2 is fed by the read channel circuit 32 of FIG. 1 to a write FF 50, whereupon the action of the write amplifier 52 by the output from the write FF 50 allows a write current to flow into any one of the write heads 22-1 to 22-8 which has been switched by the write head switching circuit 56 at that time, to perform a recording onto the magnetic disk medium. The switching of the write head switching circuit 56 is carried out by the head selector 58. A head select signal (HS signal) E3 is imparted to the head selector 58. This head select signal E3 is a 3-bit signal using three signal lines, and in this embodiment one head is selected by specifying any one of the head Nos. HH=00 to 08.

On the other hand, upon the selection of the read action by the mode selector 48, a booster 64 provided in the read circuit system is made effective, allowing a read signal (RD signal) E7 to be provided as an output to the read channel circuit 32 of FIG. 1. The booster 64 is preceded by a read amplifier 62 with a fixed gain, to which read amplifier 62 are connected via a read head switching circuit 60 the eight spin valve heads 20-1 to 20-8 functioning as the read heads. The read head switching circuit 60 is controlled by a head select signal E4 so that any one is switchably connected to the read amplifier 62 side. A read head controller 66 is further provided for receiving head control signals E5 via a plurality of signal lines from the control logic circuit 34. The control by the read head controller 66 of the read heads, that is, the spin valve heads 20-1 to 20-8 includes a current value setting control of a sense current flowing to the spin valve heads, mode control of sleep mode, idle mode, track follow idle mode, etc., and switching control of a cutoff frequency of the booster 64. A sense current switching circuit 70 operated by a sense current switching signal E6 is incorporated in the read head controller 66. The read controller 66 issues sense current signals 68 and 69 connecting to the read head switching circuit 60 so as to allow a sense current to flow into any one of the spin valve heads 20-1 to 20-8 which has been selected by the head selector 58 and to enable the direction of the sense current to be switched.

Figure 3:
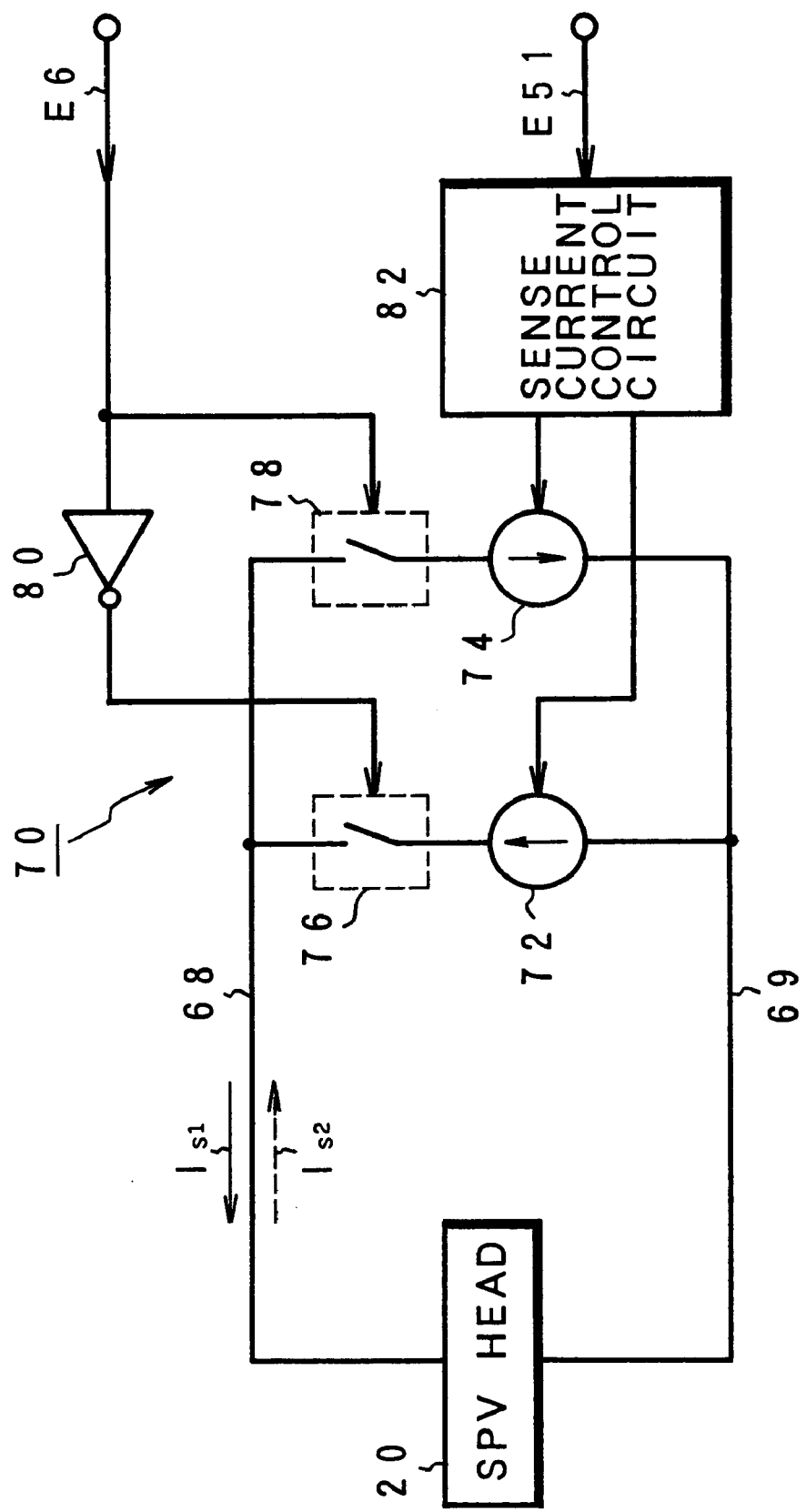
FIG. 3 is a circuit diagram of an embodiment of a sense current switching circuit incorporated into a read head controller of FIG. 2.

FIG. 3 is a circuit diagram of the sense current switching circuit 70 provided in the read head controller 66. First, it includes an assist direction current source 72 which flows an assist sense current $I_{s1}$ into the spin valve heads 20-1 to 20-8, and an interference direction current source 74 which flows a sense current $I_{s2}$ in the interference direction opposite to the assist direction. The assist direction current source 72 is connected via an analog switch 76 to the spin valve heads 20-1 to 20-8, while the interference direction current source 74 is connected via an analog switch 78 to the spin valve heads 20-1 to 20-8. The analog switch 76 is switched by a signal obtained by inverting the sense current switching signal E6 by means of an inverter. The analog switch 78 is directly switched by the sense current switching signal E6. Further associated with the assist direction current source 72 and the interference direction current source 74 is a sense current control circuit 82 for the control of the current value, which sets a current value on the basis of a sense current value setting signal E51. In the present invention, the sense current switching signal E6 is high in the state of start of use of the hard disk drive, so that the analog switch 78 is turn on whereas the analog switch 76 which goes low as a result of inversion by the inverter 80 is turned off, thereby allowing the interference direction sense current $I_{s2}$ to flow into the spin valve heads 20-1 to 20-8. The thus initialized interference direction sense current $I_{s2}$ is put in the switching state. When an offset of the pin layer of the spin valve heads 20-1 to 20-8 in the direction of magnetic field is judged, the sense current switching signal E6 goes low. In this case, the analog switch 78 goes off, whereas the analog switch 76 goes on, allowing the assist direction sense current $I_{s1}$ by the assist direction current source 72 to flow into the spin valve heads 20-1 to 20-8.

Figure 4:
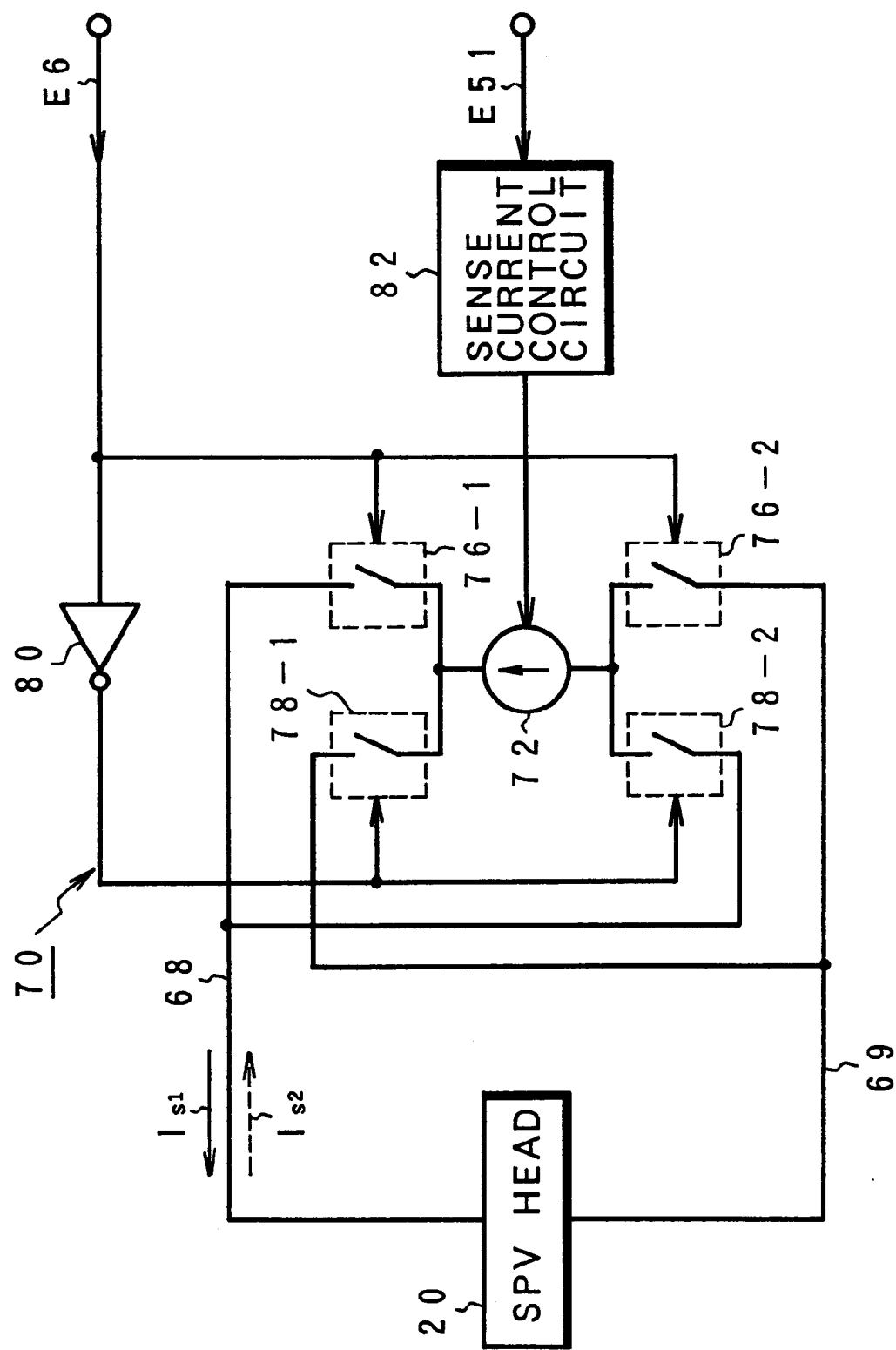
FIG. 4 is a circuit diagram of another embodiment of a sense current switching circuit incorporated int the read head controller of FIG. 2.

FIG. 4 is a circuit diagram of another embodiment of the sense current switching circuit 70. This sense current switching circuit 70 includes a single current source 72 so that the polarity of connection of the current source 72 to the spin valve heads 20-1 to 20-8 can be switched by pairs of analog switches 76-1, 76-2 and 78-1, 78-2. The current value of the current source 72 can be determined by the sense current control circuit 82 on the basis of the sense current value setting signal E51. The analog switches 76-1 and 76-2 are directly controlled by the sense current switching signal E6, whereas the analog switches 78-1 and 78-2 are controlled by a signal obtained by inverting the sense current switching signal E6 by the inverter 80. In its initial state, the sense current switching signal E4 is low so that the inversion by the inverter 80 causes the analog switches 78-1 and 78-2 to go on, with the result that the positive side of the current source 72 is connected to the sense current signal line 69 and that the negative side of the current source 72 is connected to the sense current signal line 68, thereby allowing the interference direction sense current $I_{s2}$ to flow into the spin valve heads 20-1 to 20-8. When an offset of the pin layer of the spin valve heads 20-1 to 20-8 in the direction of the magnetic field is judged in this state, the sense current switching signal E6 goes high, so that the analog switches 76-1 and 76-2 go on, allowing the constant current source 72 to flow the assist direction sense current $I_{s1}$ into the spin valve heads 20-1 to 20-8. Available as the head IC circuit 14 equipped with a sense current switching function as in FIG. 3 or 4 is for example VM 61214 manufactured by the VTC Inc.

Figure 5:
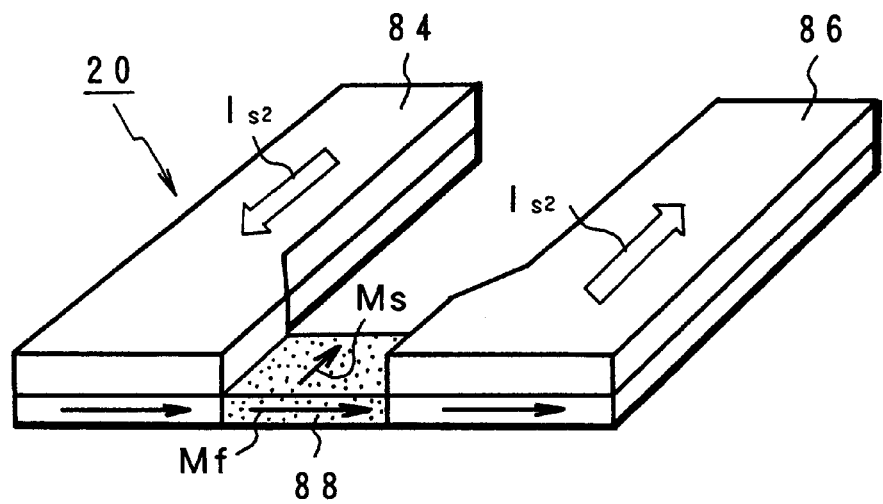
FIG. 5 is an explanatory diagram of a spin valve head.

FIG. 5 is an explanatory diagram of a spin valve head 20 for use in the present invention, with the opposed side of the magnetic disk medium closer to the viewer. The spin valve head 20 has a pair of lead terminals 84 and 86, between which is interposed a spin valve element 88. An interference direction sense current $I_{s2}$ flows through the lead terminals 84 and 86 as indicated by arrows. For this reason, the interference direction sense current causes in the spin valve element 88 a magnetic field Ms opposite in direction to the pin layer magnetic field.

Figure 6:
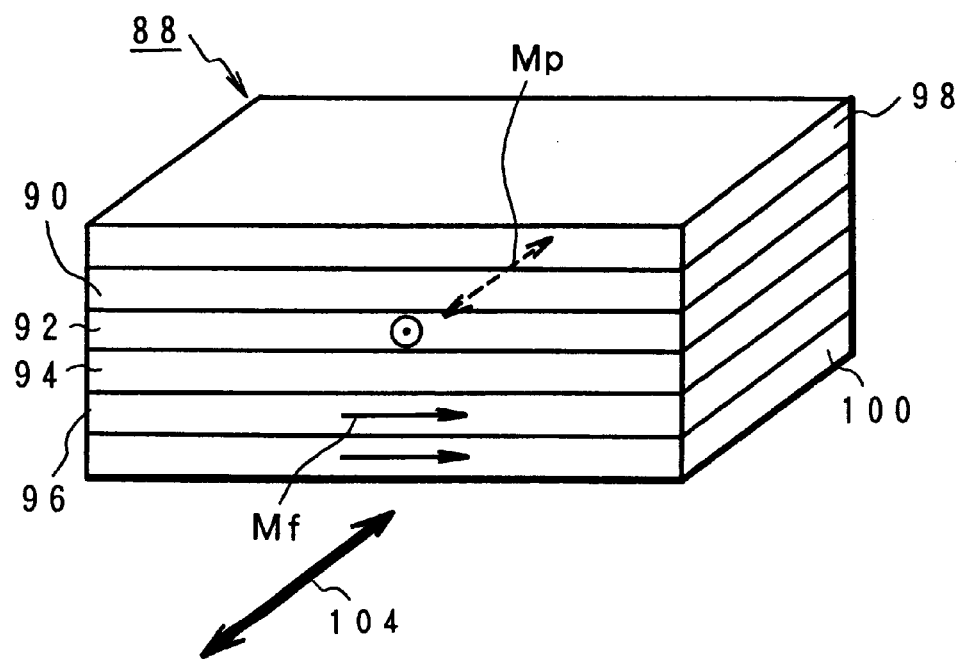
FIG. 6 is an explanatory diagram of a structure of a spin valve element of FIG. 5.

FIG. 6 illustrates the spin valve element 88 of FIG. 5 in an exclusive manner to show the structure thereof. The spin valve head 20 has a multi-layered structure consisting basically of four layers, that is, an antiferromagnetic layer 90, a pin layer 92, a nonmagnetic layer 94 and a free layer 96 in the mentioned order from the above. The antiferromagnetic layer 90 is made of e.g., Fe—Mn, CoO or Ni—Fe—Tb. The pin layer 92 and the free layer 96 which both serve as magnetic layers are made of, e.g., Ni—Fe or Co—Fe. The nonmagnetic layer 94 is made of Cu. Furthermore, a protective layer 98 is formed on top of the antiferromagnetic layer 90, and a ferromagnetic prime layer 100 is formed on the underside of the free layer 96. In such a multi-layered structure of the spin valve element 88, the direction of magnetization of the pin layer 92 in contact with the antiferromagnetic layer 90 is fixed to the pin layer magnetic field Mp indicated by an arrow. On the contrary, the free layer 96 separated by the nonmagnetic layer 94 is not put in the state of fixed direction of magnetization. When this is subjected to an external magnetic field 104 by a recording magnetic field of the magnetic disk medium, the direction of the magnetic field Mf of the free layer 96 is determined by the direction of the external magnetic field 104. The film resistance value varies depending on the difference between the free layer field Mf and the fixed pin layer magnetic field Mp. This resistance value is maximized when the directions of magnetization of the free layer 96 and the pin layer 92 are opposite to each other by 180 degrees, but is minimized when they are the same.

In the case where an interference direction sense current $I_{s2}$ flows through the spin valve head 20 as in FIG. 5, a magnetic field Ms is generated in the spin valve element 88 in the direction opposite to the direction of the magnetic field Mp of the pin layer 92 of FIG. 6. For this reason, there arises a problem that when the temperature of the antiferromagnetic layer 90 exceeds the blocking temperature due to the external temperature or heating by the impingement heat or static electricity as a result of contact of the spin valve head 20 with the disk medium surface, the direction of magnetization of the pin layer 92 may become offset. In particular, in case of using Fe—Mn as the antiferromagnetic layer 90, the blocking temperature is as low as about 150° C., the direction of the magnetic field Mp of the pin layer 92 is pone to become offset. Thus, in the present invention, in case an offset has occurred in the direction of magnetic field of the pin layer due to the increase of the head temperature attributable to the fact that the interference direction sense current flows through the spin valve head 20, the occurrence of this offset is judged to perform the processing for achieving a recovery from the abnormality including the modification of the offset in the direction of magnetization.

FIG. 7 is a characteristic diagram of the regenerative output and the asymmetry of the regenerative waveform, with respective to the direction of the sense current in the spin valve head for use in the present invention. First, the regenerative output of the spin valve head is as shown by a characteristic 107, so that it is understood that the same sense current value provides a higher regenerative output in the interference direction than in the assist direction. As is apparent from a characteristic 108, the level of the asymmetry is lower in the interference direction than in the assist direction.

Figure 8A:
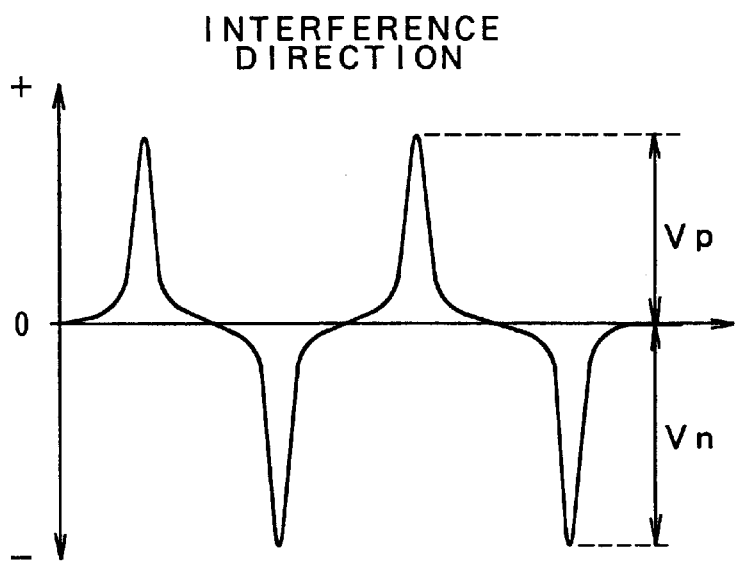
FIGS. 8A and 8B are explanatory diagrams of regenerative waveforms having different asymmetry of the sense current in the interference direction and the assist direction.
Figure 8B:
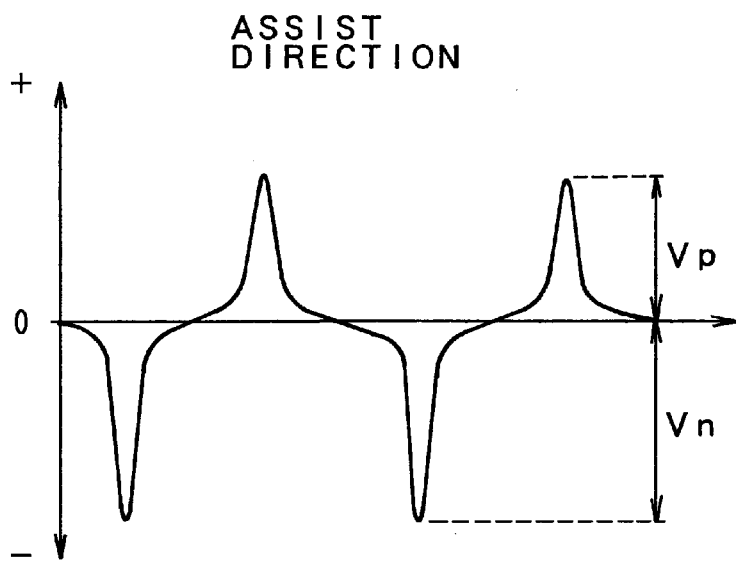

FIGS. 8A and 8B illustrate regenerative waveforms of the asymmetry characteristic 108 of FIG. 7 at the same current value in the interference direction and in the assist direction. FIG. 8A illustrates a regenerative waveform obtained when the sense current flows in the interference direction, which has an asymmetry in which the negative amplitude value Vn side is larger than the positive amplitude value Vp side. In this case, the asymmetry is defined as (Vp−Vn)/Vp FIG. 8*b* illustrates a regenerative waveform obtained when the same sense current flows in the assist direction, in which the negative amplitude value Vn side is even larger than the positive amplitude value Vp side as compared with the regenerative waveform of FIG. 8A, and which represents that the asymmetry is stronger in the assist direction than in the interference direction.

Figure 9:
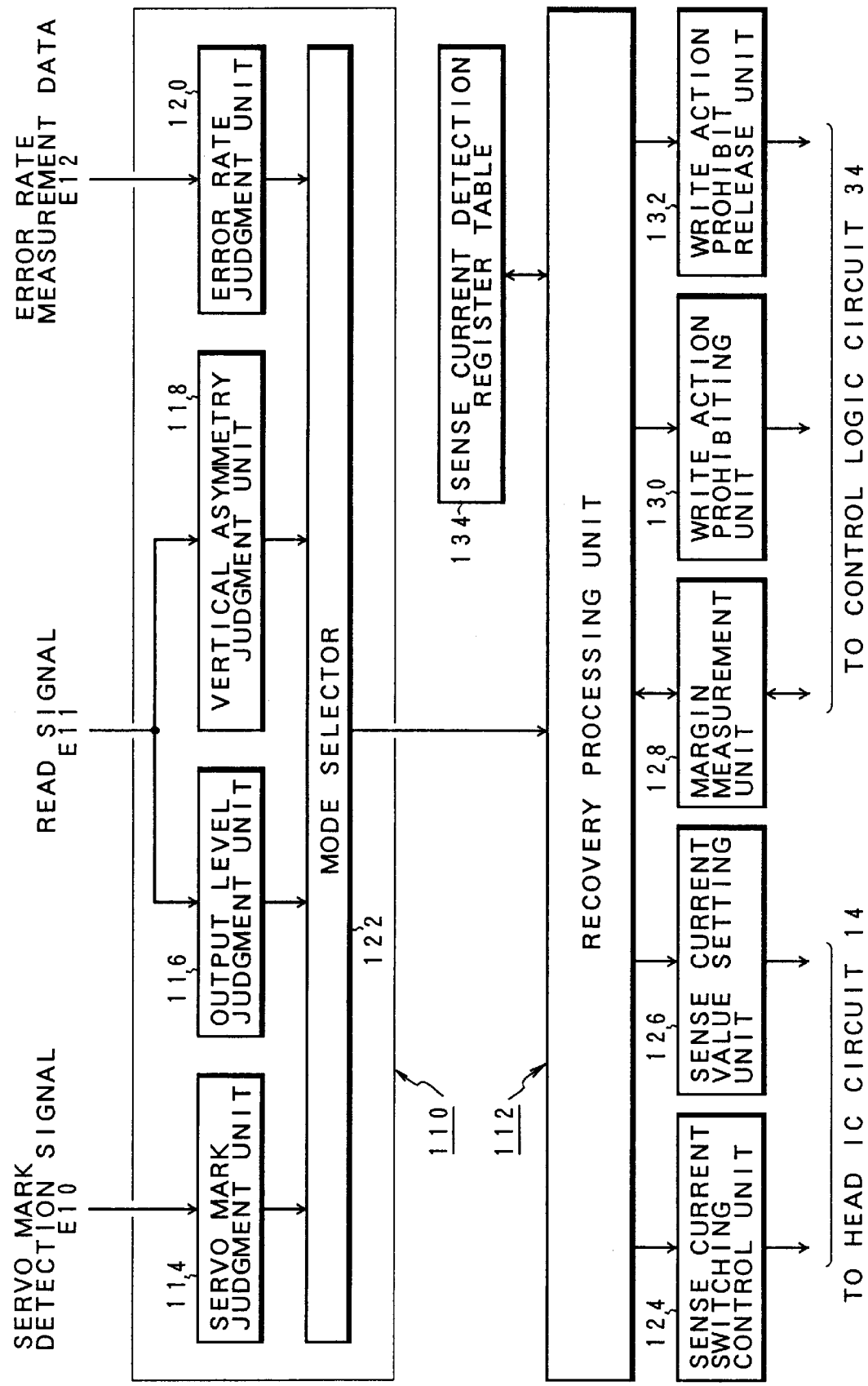
FIG. 9 is a function block diagram of recovery processing of a pin layer magnetic field offset judgment in accordance with the present invention.

FIG. 9 is a function block diagram of the pin layer magnetic field offset judgment unit 110 and the recovery processing unit 112 in accordance with the present invention provided in the MCU 28 of FIG. 1. First, the pin layer magnetic field offset judgment unit 110 judges an offset in the direction of magnetic field of the pin layer 92 which may be caused by the temperature of the antiferromagnetic layer 90 in the spin valve head 20 of FIG. 7 above the blocking temperature by heating. The judgment whether an offset of the magnetic field has occurred in this pin layer includes four judgment modes which follow.

<Judgment Mode 1>

Use is made of a servo mark for pattern judgment based on the signal polarity, so that it is judged when no servo mark can be detected that an offset of magnetic field has occurred in the pin layer. It may further be judged that the pin layer magnetic field is offset if any servo mark can be detected by switching the direction of the sense current from the interference direction to the opposed assist direction when no servo mark can be detected.

<Judgment Mode 2>

The head output level is compared with an initial value stored in advance, so that it is judged when the result is smaller than a certain range that an offset of the magnetic field has occurred in the pin layer.

<Judgment Mode 3>

The vertical asymmetry of the regenerative output waveform is measured to compare the measured vertical asymmetry with an initial value initially measured and held, so that it is judged when a certain range is exceeded that an offset of the magnetic field has occurred in the pin layer.

<Judgment Mode 4>

The error rate of demodulated read data is measured, so that it is judged when the error rate has exceeded a certain slice value that an offset of the magnetic field has occurred in the pin layer.

In a manner corresponding to such judgment modes 1 to 4, the pin layer magnetic field offset judgment unit 110 is provided with a servo mark judgment unit 114, an output level judgment unit 116, a vertical asymmetry judgment unit 118 and an error rate judgment unit 120. A mode selector 122 selects any one mode of the four modes 1 to 4 to provide a pin layer positional offset judgment signal as an output to the recovery processing unit 112. It is natural that the offset of the magnetic field in the pin layer may be judged by the combination of the plurality of modes, instead of using a specific single mode. Upon the receipt of a judgment result of the pin layer magnetic field offset from the pin layer magnetic field offset judgment unit 110, the recovery processing unit 112 performs recovery processing for achieving a recovery from the abnormality attendant on the pin layer magnetic field offset. This recovery processing is basically performed in accordance with the following procedure.

I. The direction of the sense current is switched from the interference direction to the assist direction.

II. If a normal read action is achieved as a result of the switching of the direction of the sense current to the assist direction, the recovery processing terminates.

III. If a normal read action is not achieved as a result of the switching to the assist direction, the temperature is raised to above a blocking temperature of the antiferromagnetic layer 90, with the sense current value larger than the ordinary value, to thereby modify the direction of the magnetic field in the pin layer with the magnetic field caused by the sense current in the assist direction.

IV. After the completion of the modification of the direction of the magnetic field in the pin layer, the direction of the sense current is returned to the interference direction so that the recovery processing terminates if an ordinary read action is achieved with an ordinary current value.

V. In the case of III and IV for modifying the direction of the magnetic field in the pin layer, a writing action in response to a write demand from the host is prohibited until a read action is normally verified.

In a manner corresponding to such recovery processing for the pin layer magnetic field offset executed by the recovery processing unit 112, the recovery processing unit 112 is associated with a sense current switching control unit 124, a sense current value setting unit 126, a margin measurement unit 128, a write action prohibiting unit 130 and a write action prohibit release unit 132. The sense current switching control unit 124 provides a sense current switching signal E6 as its output to the read head controller 66 of FIG. 2 for example provided in the head IC circuit 14, to controllably switch the direction of the sense current flowing into the spin valve head being selected at that time. The sense current value setting unit 126 is used to switch the direction of the sense current through the spin valve head to the assist direction for heating to above the blocking temperature, to set the current value of the sense current upon the modification of the pin layer magnetic field offset to a value larger than an ordinary value and to restore it after the modification. More specifically, a current value is set by a sense current value setting signal E51 fed to the sense current control circuit 82 provided in the sense current switching circuit 70 of FIG. 3 or FIG. 4. The margin measurement unit 128 performs processing for measuring whether the read action can normally be achieved after the execution of the recovery processing for the pin layer magnetic field offset in the spin valve head. More specifically, it is used for the verification of the read action either when the direction of the sense current has been switched to the assist direction after the judgment of the pin layer magnetic field offset, or when, if a normal read action is not achieved by merely switching to the assist direction, the direction of the sense current has been returned to the interference direction after the modification of the pin layer magnetic field offset by increasing the current value in the assist direction. In order to execute this margin measurement by the margin measurement unit 128, a data pattern for read margin measurement is written in advance into a system area outside the user area on the magnetic disk medium, and this data pattern for read margin measurement is read out to measure I. an offset margin relative to the track center on the outer side;

II. an offset margin relative to the track center on the inner side; and

III. a Viterbi slice margin (error rate) of the maximum likelihood detector.

Once the pin layer magnetic field offset judgment unit 110 posts the recovery processing unit 112 on the result of judgment of the pin layer magnetic field offset, the write action prohibiting unit 130 prohibits the writing action of the write head integrated into the spin valve head in which a pin layer magnetic field offset has occurred. The write action prohibit release unit 132 releases the prohibition of the write action which has been made by the write action prohibiting unit 130 at the start of the recovery processing, either in the case where the result of measurement by the margin measurement unit 128 after the switching of the sense current to the assist direction by the recovery processing unit 112 is satisfactory, or where the result of measurement of the margin after mere switching to the assist direction is unsatisfactory but the result of the margin measurement, when the sense current in the interference direction has been flowed after the modification of the direction of the pin layer magnetic field by increasing the current in the assist direction, is satisfactory. The conditions of release of the prohibition by the write action prohibit release unit 132 are that at least offset margin in the measurement result of the margin measurement unit 128 is substantially equal in the outer side and in the inner side, and that the width of the Viterbi slice margin or offset margin defined as a read margin meets a prescribed value. The recovery processing unit 112 is further associated with a sense current direction register table 134 using a nonvolatile memory. The sense current direction table 134 registers as shown in FIG. 10 for example the directions of the sense current at that time corresponding to the head Nos. HH.

In FIG. 10, eight head Nos. HH 01 to 08 are provided and all the directions of the sense current are set to the interference direction in the initial state. In this table, the head No. HH=05 has a registered content of the assist direction because it has been judged that an offset of the magnetic field has occurred in the pin layer in use of the head No. HH=0.5, so that the direction of the sense current has been switched from the interference direction to the assist direction, and because it has been confirmed that the read action can normally be achieved as the result of this switching to the assist direction. In the MCU 28 of FIG. 1 for this reason, reference is made to the sense current direction register table 134 of FIG. 10 using the head No. HH posted by the read command from the host, to thereby supply via the dedicated logic circuit 34 to the head IC circuit 14 a sense current switching signal in accordance with the direction of the sense current registered, allowing the sense current in the interference direction or the assist direction to flow in conformity with the content of the table. Instead of the structure allowing the rewrite from the initial registration as shown in FIG. 10, the sense current direction register table may have a structure in which when the sense current of a certain head has been switched from the interference direction to the assist direction, the head No. and the switching to the assist direction are registered therein.

FIGS. 11A to 11D are timing charts of detection processing of a servo mark detection signal to be judged by the servo mark judgment unit 114 provided in the pin layer magnetic field offset judgment unit 110. FIG. 11A illustrates a head output signal E11 obtained in the state where the interference current flows into the spin valve head having normal direction of the magnetic field in the pin layer, the head output signal E11 having a peak waveform of +-+-+at 6T, 6T, 3T, 3T from the record pattern of the servo mark detection unit 136. A peak signal E13 obtained by peak detecting this head output signal E11 is as shown in FIG. 11B, and a polarity signal E14 thereof is as shown in FIG. 11C. A servo mark detection signal E10 of FIG. 11D represents that a servo mark exists, if the peak signal E13 is obtained with the polarity signal E14 being low at a position apart 6T from the position of the peak signal E13 where the polarity signal E14 goes high, and if the peak signal E13 is obtained with the polarity signal E14 being high at the position where following 6T has elapsed, and if the peak signal E13 is obtained with the polarity signal E14 being low at the position where the following 3T has elapsed, and if the peak signal E3 is obtained with the polarity signal E14 being high at the position where the following 3T has elapsed.

FIGS. 12A to 12D are timing charts of the servo mark detection processing in the case where the direction of the magnetic field in the pin layer has been inverted with the result that the polarity of the head output signal E11 has been inverted. Attendant on the inversion of the direction of the magnetic field in the pin layer, the head output signal E11 of FIG. 12A has a polarity which has been inverted relative to that of the head output signal E11 in the normal case of FIG. 11A. For this reason, although the peak signal E13 of FIG. 12B is the same as that of FIG. 11B, the polarity signal E14 of FIG. 12C results in a signal obtained by inverting the polarity signal E12 of FIG. 11C in the normal case, which will not satisfy the conditions of detection of the servo mark 136, resulting in no acquisition of the servo mark detection signal E10 as shown in FIG. 12D.

Figure 13A:
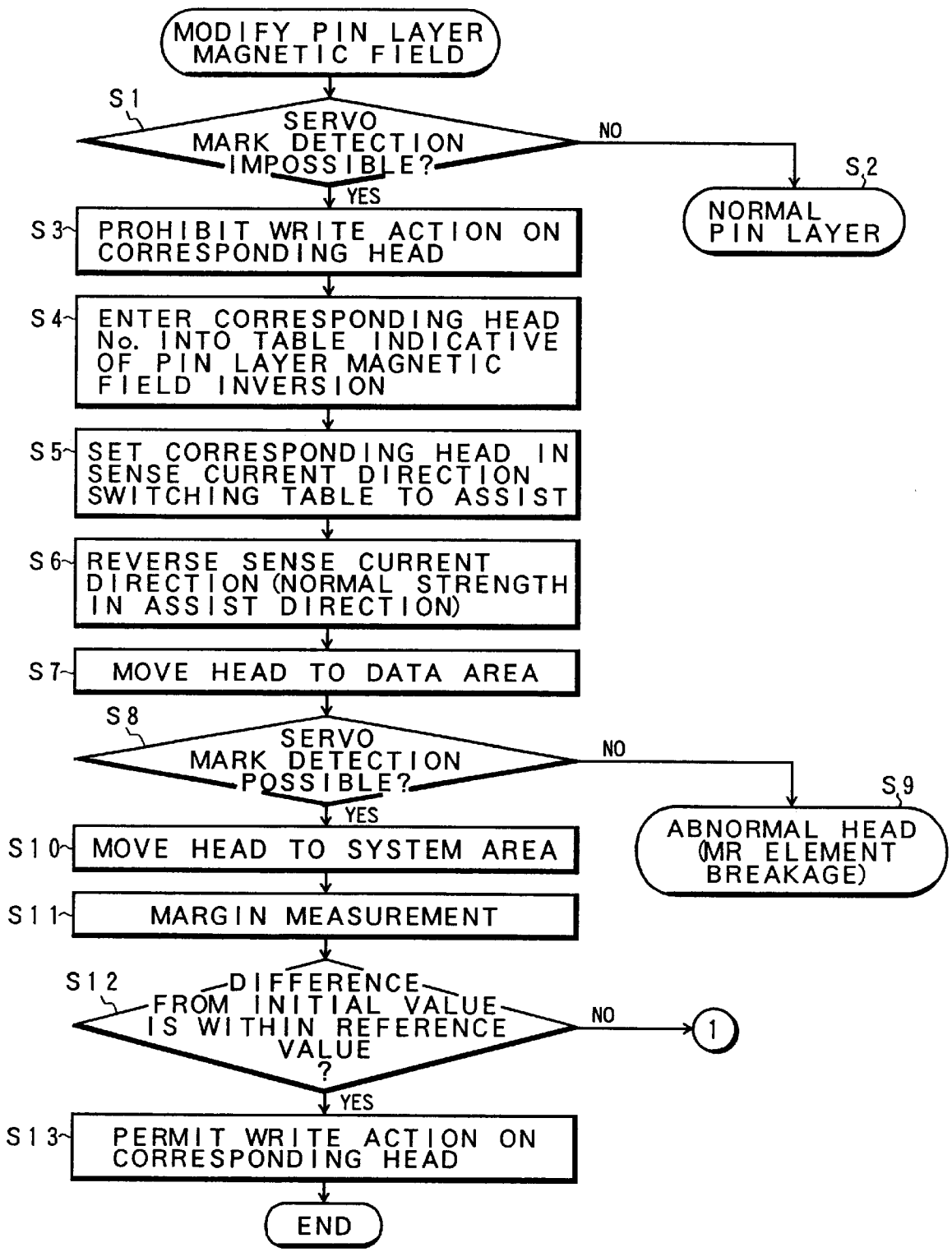
FIGS. 13A and 13B are flow charts of recovery processing of the pin layer magnetic field offset judgment of FIG. 9.
Figure 13B:
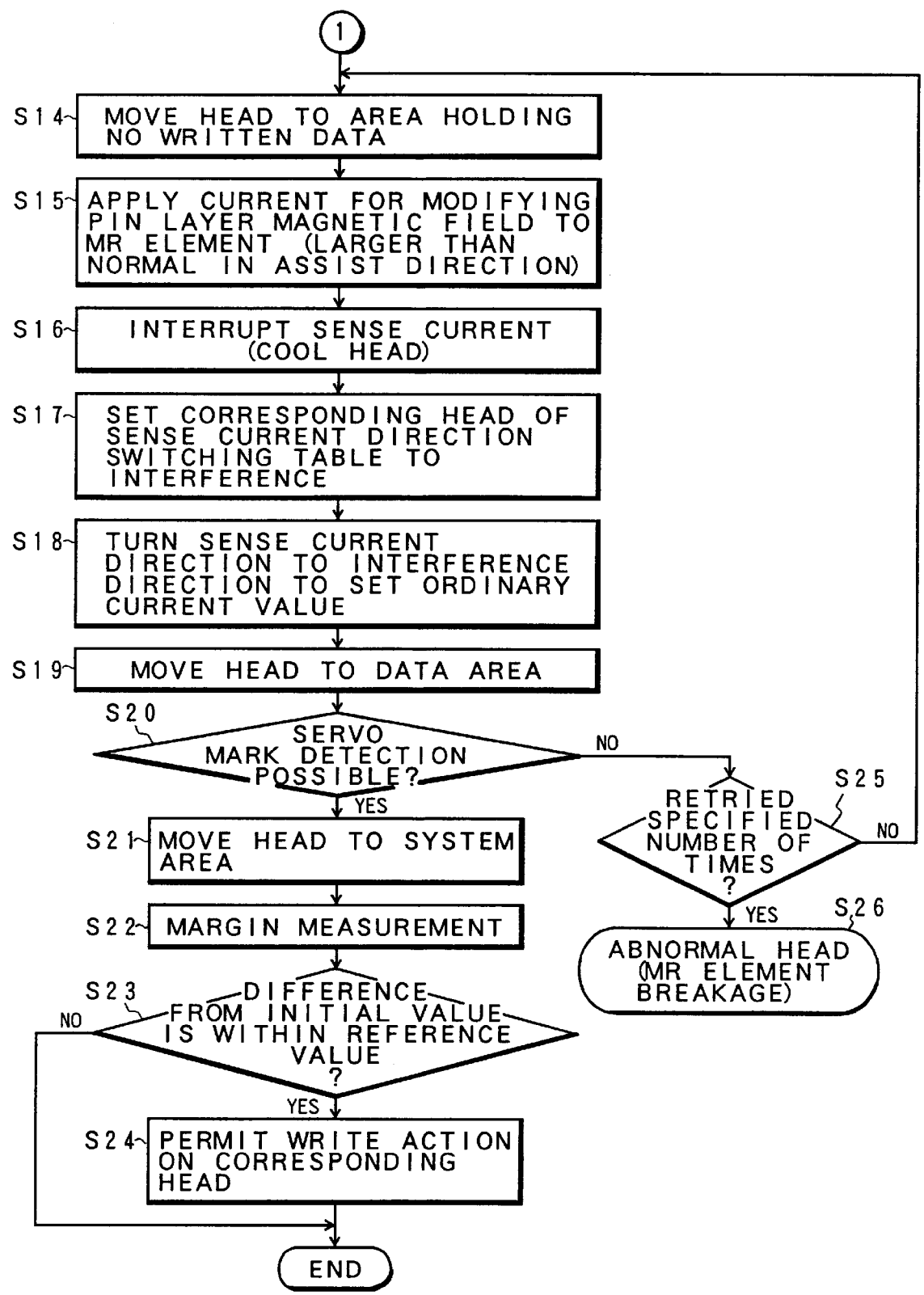

FIGS. 13A and 13B are flowcharts of the pin layer magnetic field offset judgment and the recovery processing thereof in accordance with the present invention of FIG. 9. First, in step S1, a check is made to see if the servo mark can normally be detected as in FIGS. 11A to 11D. If the servo mark can be detected, the procedure goes to step S2, in which it is judged that the direction of the magnetic field in the pin layer is normal. If the direction of the magnetic field in the pin layer has been inverted with the result that no servo mark can be detected as in the timing charts of FIGS. 12A to 12D for example, the procedure advances to step S3 for prohibiting the write action on the head being currently selected. Then, in step S4, the head No. HH of the spin valve head which has been subjected to the inversion of the magnetic field in the pin layer is registered into the sense current direction register table 134, and in step S5 the assist direction is registered as the direction of the sense current in a manner corresponding to the head No. registered in the table. It is to be appreciated that for the registration into the table of steps S4 and S5, the interference direction may initially be registered as the direction of the sense current in a manner corresponding to the head No. HH as shown in FIG. 10 and that upon the judgment of the inversion of the magnetic field in the pin layer, the direction of the sense current of the head No. HH in question may be changed from the initially registered interference direction to the assist direction. After the completion of the registration processing of the sense current direction register table in this manner, a sense current switching signal is imparted to the head IC circuit 14 in step S6, to invert the direction of the sense current to the assist direction. The current value in this case is an ordinary current value. Then, in step S7 the head is moved to the data area, and in step S8 it is again judged whether it is possible to detect a servo mark.

In this case it was impossible to detect a servo mark due to the inversion of the polarity of the head output signal E11 as a result of inversion of the magnetic field in the pin layer as in FIGS. 12A to 12D, so that by inverting the direction of the sense current to the assist direction in step S6, the polarity of the head output signal becomes normal as in FIGS. 11A to 11D, allowing the detection of the servo mark. In case it is not possible to detect the servo mark in step S8, it is judged in step S9 a head abnormality such as element breakage has occurred. If it is possible to detect the servo mark, then in step S10 the head is moved to the system area to perform the margin measurement in step S11. For this margin measurement, a data pattern for read margin measurement previously written into the system area is read out to measure an offset margin relative to the track center. This offset margin measurement is made both on the outer side system area and on the inner side system area. Furthermore, the Viterbi slice margin is measured by measuring the error rate, etc., in the maximum likelihood detector. Then, in step S12 it is judged whether a difference between the offset margin being held in advance and the initial value of the Viterbi slice margin is less than a predetermined reference value. Since if it is less than the reference value the read action is normally achieved, in step S13 the prohibition of the write action on the head which is currently a processing target is released to permit the write action to terminate a series of recovery processing, allowing a return to the ordinary action state. On the contrary, in case the difference from the initial value in step S12 exceeds the reference value with the result that it is impossible to perform the ordinary read action, the procedure goes to step S14 of FIG. 13B, starting the modification processing of the magnetic field in the pin layer. First, in step S14, the head is moved to an area to which no data are written. The area to which no data are written may be a vacant area of the user area or may be a vacant area of the system area outside the user area. Then, in step S15, the current value of the sense current being currently switched to the assist direction is changed to the current value for the modification of pin layer magnetic field, which is larger than the ordinary current value, and the resultant current is applied to the MR element. The increase of the sense current value in the assist direction allows the temperature of the antiferromagnetic layer 90 to be raised to above the blocking temperature due to the generation of heat by the resistance of the spin valve element 88 shown in FIG. 7, with the result that the direction of the magnetic field in the pin layer 92 is modified to the correct direction by virtue of the magnetic field in the assist direction of the sense current. Then, in step S16, the sense current is interrupted to cool the head. For this interruption of the sense current, the sense current is gradually decreased so that the magnetic field continues to be applied in the correct direction even when the head temperature falls down to below the blocking temperature. Then, in step S17, the content of registration of the head No. of the head which is a currently processing target in the sense current direction table 134 is returned from "assist direction" to "original interference direction". Then, in step S18, the sense current switching signal E6 for the head IC circuit 14 is switched to change the direction of the sense current to the interference direction, with the current value at that time being the ordinary current value. Then, in step S19, the head is moved to the data area, and a check is made in step S20 to see if it is possible to detect a servo mark. If it is possible to detect the servo mark, then in steps S21 the head is moved to the system area, allowing the margin measurement to be performed in step S22. If a difference between the margin obtained from the result of the margin measurement and the initial value is less than a reference value, then in step S24 the prohibition of the write action on the head being currently processed is released, in other words, the write action is permitted to return to the ordinary processing. If in step S23 the difference between the measured margin and the initial value has exceeded the reference value, the processing is terminated without performing the write permitting action. In this case, the write action using the head which has been subjected to an offset of the direction of the magnetic field in the pin layer is not to be carried out. On the contrary, if it is impossible to detect the servo mark in spite of modification of the direction of the magnetic field in the pin layer in step S20, the procedure goes to step S25, in which a check is made to see if retry has been made by predetermined number of times. If the predetermined number of times has not yet been reached, then the procedure goes back to step S14 for again performing the magnetic field modification processing. If it is impossible to detect the servo mark in spite of the retry by the predetermined number of times, then in step S26 the processing is terminated for the head abnormality.

Although in this case the modification of the direction of the magnetic field in the pin layer in the recovery processing unit 112 of FIG. 9 is carried out by flowing a larger current than the ordinary time with the direction of the sense current switched to the assist direction, to thereby heat the antiferromagnetic layer 90 to above the blocking temperature, to modify the direction of the magnetic field in the pin layer to the correct direction by the action of the magnetic field of the sense current at that time, a magnet may used for the alternative modification processing of the direction of the magnetic field in the pin layer. More specifically, an electromagnet or a permanent magnet for generating a magnetic field in the normal magnetic field direction in the pin layer is located at the position allowing a move of the head out of the length of the magnetic disk medium. If it is judged that the magnetic field in the pin layer has been inverted, the head is moved to the position where the magnet is located, in which state a current larger than the ordinary time in the assist direction is flowed to raise the temperature of the antiferromagnetic layer to above the blocking temperature so that the direction of the magnetic field in the pin layer is modified to the ordinary direction by the magnetic field from the magnet. Upon the modification of the magnetic field in the pin layer in step S14 of FIG. 13B, the head is moved to an area to which no data have not been written, although this area for move can be for example a contact start stop area (CCS area) provided in the innermost of the magnetic disk medium. Also, in the case of a magnetic disk apparatus employing a ramped loading mechanism, a current larger than the ordinary time in the assist direction is applied for the modification of the magnetic field in the pin layer with the head moved to the position of the head ramp. Furthermore, in the case where through the processing of steps S1, S3 to S8, and S10 to S13 of FIG. 13A it has become possible to detect the servo mark by switching the direction of the sense current to the assist direction as a result of no detection of the servo mark and where it has become possible to normally perform the read action due to the margin measurement, the current value of the sense current flowed upon the read action in the case of switching to the assist direction is to be larger than the current value of the current flowed in the interference direction. This is because, as is apparent from the regenerative output characteristic 107 of FIG. 7, the regenerative output is reduced by about 20% to 50% when the sense current has been switched from the interference direction to the assist direction, so that the current value in the case of switching to the assist direction is made larger than the current value flowed in the interference direction to thereby prevent any reduction of the regenerative output. The judgment of an offset of the direction of the magnetic field in the pin layer in the present invention and the recovery processing is executed on all of the plurality of spin valve heads in the state where on-track has normally been achieved immediately after the supply of power to the magnetic disk apparatus. Also when the magnetic disk apparatus is in the power down mode or the timer calibration mode, the pin layer magnetic field offset judgment and recovery processing in accordance with the present invention is performed on all of the plurality of the spin valve heads.

Figure 14:
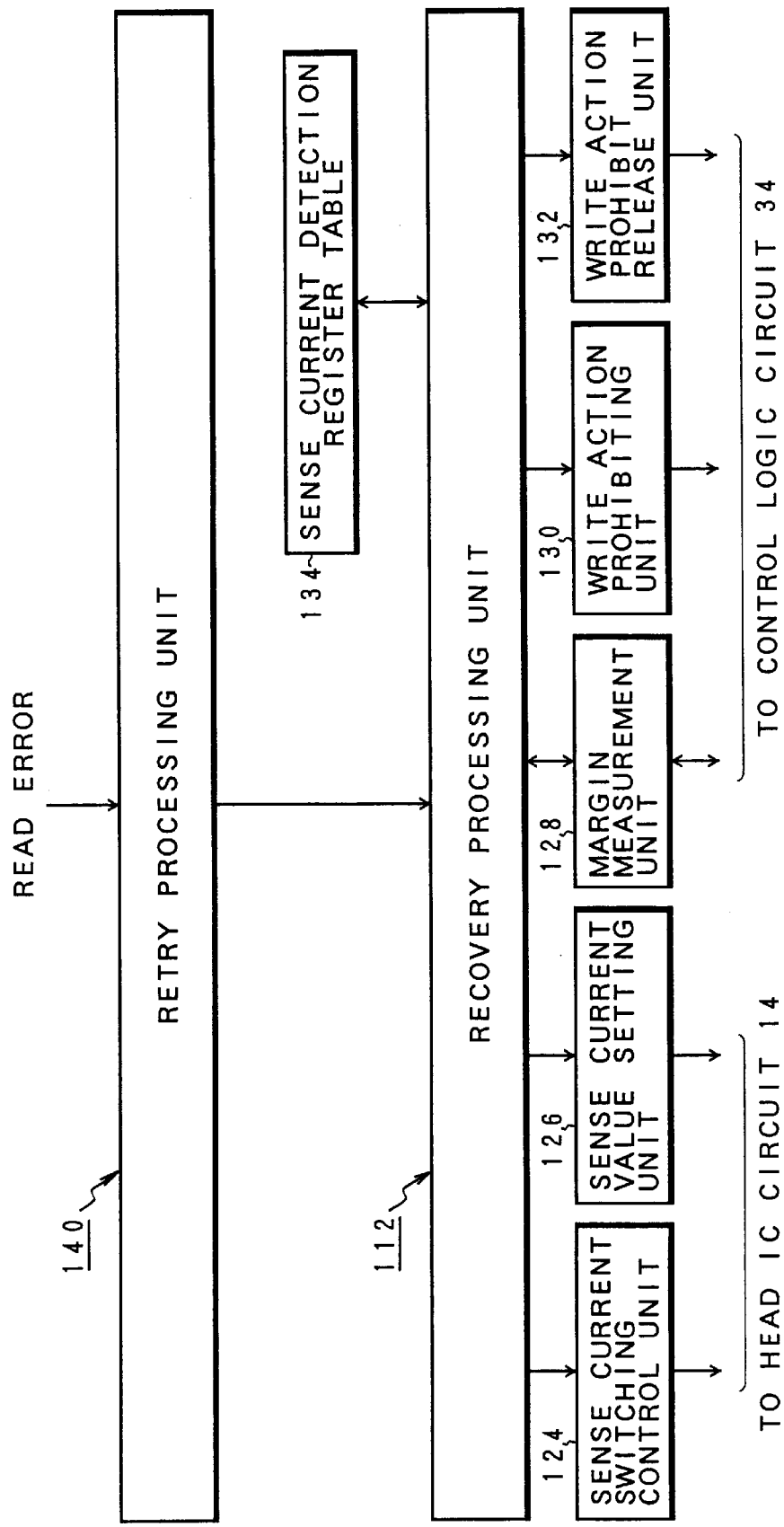
FIG. 14 is a function block diagram of another embodiment of the present invention, in which the recovery processing for modifying the pin layer magnetic field offset is performed as a part of error recovery.

FIG. 14 illustrates another embodiment of the present invention. This embodiment is characterized in that instead of performing the judgment processing by the pin layer magnetic field offset judgment unit 110 of FIG. 9, if it is impossible to perform the recovery from the error through the retry processing for the read error by the retry processing unit 140, the recovery processing unit 112 is activated to achieve a recovery from the abnormality arising from the offset of the direction of the magnetic field in the pin layer. The retry processing unit 140 performs the retry processing by the prescribed number of times when a read error occurs. In case the read error is not eliminated in spite of execution of the retry processing by the prescribed number of times, the recovery processing unit 112 is activated to switch the direction of the sense current from the interference direction to the assist direction. In case the reading action is not normally achieved in spite of the switching to the assist direction, the sense current in the assist direction is increased to raise the temperature to thereby modify the pin layer magnetic field direction. To this end, the recovery processing unit 112 is associated with the sense current switching control unit 124, the sense current value setting unit 126, the margin measurement unit 128, the write action prohibiting unit 130 and the write action prohibit release unit 132. The recovery processing of the pin layer magnetic field direction executed by the recovery processing unit 112 when the acceptable processing by this retry processing unit 140 became unsuccessful is substantially the same as that in the embodiment of FIG. 9.

According to the present invention as described hereinabove, in case an offset of the magnetic field direction in the pin layer has occurred due to a certain cause when a sense current in the interference direction flows into the spin valve heads, this offset is detected so that the direction of the sense current is switched to the assist direction or so that in case normal action is not achieved in spite of the switching to the assist direction the sense current is increased to perform a heating to above the blocking temperature, to thereby achieve a modification to the correct magnetic field direction so as to allow a return to the original direction, whereby the reading action by the spin valve heads into which the sense current flows in the interference direction is assured, making it possible to remarkably improve the reliability.

It is to be appreciated that the present invention is not limited to the above embodiments and may appropriately be modified without impairing the objects and advantages thereof. Furthermore, the present invention is not intended to be restricted by the numerical values shown in the embodiments.

What is claimed is:

1. A storage apparatus provided with a plurality of heads each having a read head and a write head which have been integrated thereinto, said read head comprising a spin valve head having a multilayered structure including an antiferromagnetic layer, a pin layer, a nonmagnetic layer and a free layer, said spin valve head electrically reading record information from a variation in the magnetic reluctance in response to a record magnetic field of a medium applied in the form of an external magnetic field with a sense current being allowed to flow therethrough in the interference direction causing a magnetic field opposite to the magnetic field in said pin layer, said storage apparatus comprising:

a pin layer magnetic field offset judgment unit which, when there is judged a predetermined abnormality attributable to a magnetic field offset in said pin layer of said spin valve head, inverts the direction of said sense current and consequently if said predetermined abnormality is eliminated, judges that an offset of the magnetic field has occurred in said pin layer; and a recovery processing unit which, when said pin layer magnetic field offset judgment unit has judged that an offset of the magnetic field in said pin layer has occurred, allows a recovery from the abnormality arising from said offset in the magnetic field.

2. A storage apparatus according to claim 1, wherein said pin layer magnetic field offset judgment unit, when servo marks recorded on said record medium can be detected no longer, judges that there has occurred said abnormality attributable to a magnetic field offset in said pin layer, and wherein said pin layer magnetic field offset judgment unit inverts the direction of said sense current and consequently if it has become possible to detect said servo marks, judges that an offset of the magnetic field has occurred in said pin layer.

3. A storage apparatus according to claim 2, wherein said recovery processing unit when it has become possible to detect said servo marks as a result of switching of the direction of said sense current from the interference direction to the assist direction, allows said sense current to flow through said spin valve head in the assist direction upon the reading action.

4. A storage apparatus according to claim 3, wherein said recovery processing unit when the direction of said sense current has been switched to the assist direction as a result of occurrence of an offset of the magnetic field in said pin layer, stores into a nonvolatile memory that the direction of said sense current is the assist direction in a manner corresponding to head numbers, said recovery processing unit determining the direction of said sense current upon the reading action on the basis of the content of record of said nonvolatile memory.

5. A storage apparatus according to claim 3, wherein said recovery processing unit when the direction of said sense current has been switched to the assist direction, allows upon the reading action said sense current to flow with a larger current value than the current value in the interference direction before switching.

6. A storage apparatus according to claim 1, wherein said pin layer magnetic field offset judgment unit compares an output level of said spin valve head with its initial value and, if the difference lies within a predetermined range, judges that said abnormality attributable to an offset of the magnetic field has occurred in said pin layer.

7. A storage apparatus according to claim 1, wherein said pin layer magnetic field offset judgment unit measures vertical asymmetry of a read signal of said spin valve head and, if a difference between said vertical asymmetry and its initial value has exceeded a certain range, judges that said abnormality attributable to an offset of the magnetic field has occurred in said pin layer.

8. A storage apparatus according to claim 1, wherein said pin layer magnetic field offset judgment unit when an error rate of read data demodulated from a read signal of said spin valve head has exceeded a predetermined slice value, judges that said abnormality attributable to an offset of the magnetic field has occurred in said pin layer.

9. A storage apparatus according to claim 1, wherein said pin layer magnetic field offset judgment unit upon the first on-track after the supply of power judges for all of said plurality of spin valve heads whether an offset of the magnetic field has occurred in said pin layer.

10. A storage apparatus according to claim 1, wherein said pin layer magnetic field offset judgment unit upon the power down mode or upon the timer calibration judges for all of said plurality of spin value heads whether an offset of the magnetic field has occurred in said pin layer.

11. A storage apparatus according to claim 1, wherein said recovery processing unit when it is judged that an offset of the magnetic field has occurred in said pin layer, moves said spin valve head to an area in which no medium data have been stored, to switch the direction of said sense current from the interference direction to the assist direction, said recovery processing unit simultaneously allowing a larger sense current than that at the ordinary reading to flow therethrough so that the temperature of said antiferromagnetic layer exceeds the blocking temperature, so as to modify the magnetic field in said pin layer to the normal direction by the action of a magnetic field generated by said sense current, said recovery processing unit after the modification allowing a return of the value of said sense current to its ordinary value in the interference direction.

12. A storage apparatus according to claim 11, wherein said recovery processing unit when interrupting said sense current switched to the assist direction to modify the magnetic field in said pin layer, gradually diminishes the value of said sense current so as to ensure that the magnetic field continues to be applied in the correct direction even when the temperature has fallen to below the blocking temperature of said antiferromagnetic layer.

13. A storage apparatus according to claim 12, wherein said recovery processing unit moves said spin valve head to a ramped loading mechanism to return the direction of the magnetic field in said pin layer to the normal direction.

14. A storage apparatus according to claim 11, wherein said recovery processing unit moves said spin valve head to a contact start stop area at the innermost of said medium to return the direction of the magnetic field in said pin layer to the normal direction.

15. A storage apparatus according to claim 1, wherein said recovery processing unit is provided with a magnet located at a position to which said head is movable other than positions on said medium, said magnet generating a magnetic field in the normal magnetic field direction in the pin layer, and wherein said recovery processing unit when it is judged that an offset of the magnetic field has occurred in said pin layer, moves said spin valve head to said position of said magnet and allows a current to flow through said spin valve to raise the temperature of said antiferromagnetic layer to modify the direction of the magnetic field in said pin layer to the ordinary direction, said recovery processing unit after said modification allowing a return of the value of said sense current to its ordinary value in the interference direction.

16. A storage apparatus according to claim 1, wherein said pin layer magnetic field offset judgment unit when it is judged that an offset of the magnetic field has occurred in said pin layer of a spin head valve, provides an error response to a write command specifying a write head integrated with said spin valve, to prohibit the writing action.

17. A storage apparatus according to claim 16, wherein said pin layer magnetic field offset judgment unit after the recovery from abnormality arising from an offset of the magnetic field in said pin layer by said pin layer magnetic field offset judgment unit, reads a data pattern for read margin measurement recorded on a system space of said medium and, if at least offset margin on the outer side is substantially equal to that on the inner side and if a read margin such as a Viterbi slice margin and said offset margin satisfies a prescribed value, releases said write prohibition.

* * * * *

UNITED STATES PATENT AND TRADEMARK OFFICE
CERTIFICATE OF CORRECTION

PATENT NO. : 6,295,175 B1
DATED : September 25, 2001
INVENTOR(S) : Tomita et al.

It is certified that error appears in the above-identified patent and that said Letters Patent is hereby corrected as shown below:

Column 16,
Lines 53, 60, 61, 61, 63 and 67, delete "pin" and insert -- pinned -- therefor;

Column 17,
Lines 1, 3, 7, 10, 11, 14, 26, 40, 46, 51, 53, 57, 59, 62, 64 and 67 delete "pin" and insert -- pinned -- therefor;

Column 18,
Lines 3, 11, 20, 20, 28, 33, 39, 42, 45, 50, 52, 57, 59 and 59, delete "pin" and insert -- pinned -- therefor;

Signed and Sealed this

Twenty-seventh Day of August, 2002

Attest:

JAMES E. ROGAN
Attesting Officer  Director of the United States Patent and Trademark Office